United States Patent [19]

Bruni

[11] Patent Number: 5,081,968

[45] Date of Patent: Jan. 21, 1992

[54] PISTONS FOR AN INTERNAL COMBUSTION ENGINE

[75] Inventor: Ludovico Bruni, Turin, Italy

[73] Assignee: Borgo Nova SpA, Turin, Italy

[21] Appl. No.: 734,469

[22] Filed: Jul. 23, 1991

[30] Foreign Application Priority Data

Jul. 31, 1990 [IT] Italy .................................. 67613 A/90

[51] Int. Cl.⁵ .............................................. F02F 3/00
[52] U.S. Cl. .................... 123/193 P; 92/186;
92/217; 92/218
[58] Field of Search ............. 123/193 P, 41.16, 41.35;
92/186, 217, 218, 219, 231, 176

[56] References Cited

U.S. PATENT DOCUMENTS

| | | | |
|---|---|---|---|
| Re. 19,904 | 0/0000 | Donaldson | 92/218 |
| 1,900,991 | 3/1933 | Matheson | 92/217 |
| 3,628,511 | 12/1971 | Fischer | 92/186 |
| 4,947,805 | 8/1990 | Steppat et al. | 92/186 |

Primary Examiner—E. Rollins Cross
Assistant Examiner—M. Macy
Attorney, Agent, or Firm—Nixon & Vanderhye

[57] ABSTRACT

A piston for an internal combustion engine is described, the piston having a lower crown portion and an upper crown portion, the upper crown portion including a combustion bowl and a piston ring-groove belt of generally annular form depending from the outer periphery of the crown surface, the lower crown portion comprising a generally circular plate member having an upstanding ring on the upper surface thereof, the upper crown portion and the lower crown portion being joined together by retention means between the combustion bowl and the upstanding ring, and between co-operating spigot and socket means formed on the base of the combustion bowl and on the plate member, to prevent withdrawal by axial forces, and there being an oil cooling gallery defined between the upper crown portion and the lower crown portion.

10 Claims, 1 Drawing Sheet

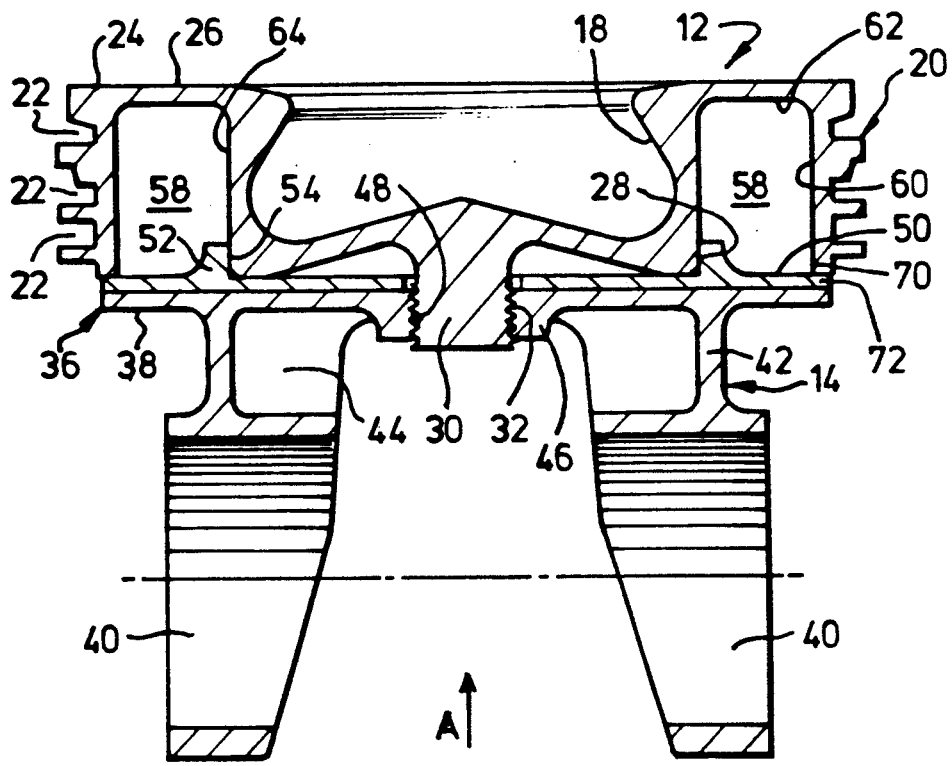
FIG.1
FIG.3
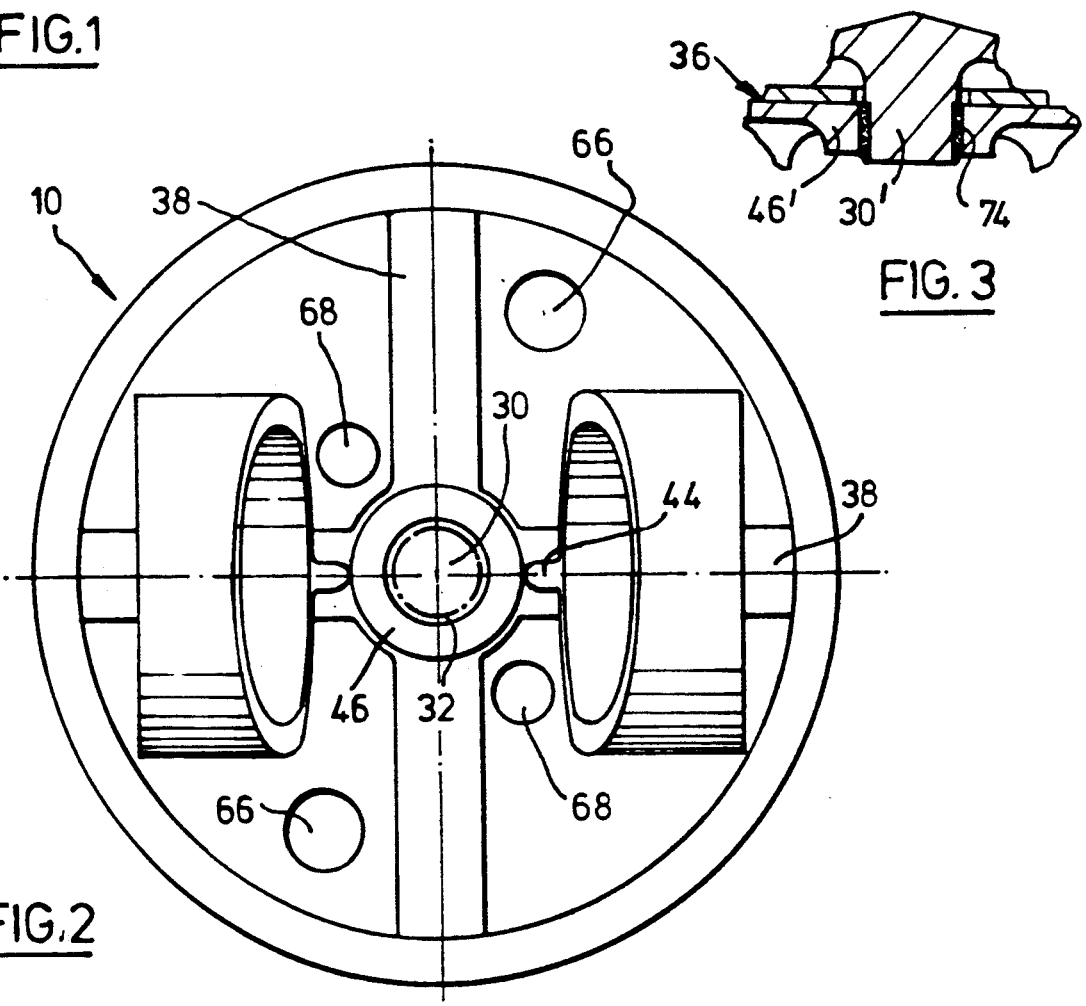
FIG.2

PISTONS FOR AN INTERNAL COMBUSTION ENGINE

The present invention relates to pistons particularly, though not exclusively for internal combustion engines of the diesel type.

In the case of some highly supercharged diesel engines, for example, it is essential to have adequate cooling in the crown region behind the piston rings. Such cooling is frequently obtained by the inclusion of a gallery for the circulation of cooling oil.

The provision of such an oil cooling gallery in a single piece cast piston is very difficult, involving cores which must subsequently be removed from the piston casting. Where such single piece pistons are produced the thickness of the metal sections around the cooling gallery is often much thicker than is desirable for reasons of heat transfer and weight.

In some pistons the architecture is too complicated to ensure suitable conditions for the solidification of the molten metal, resulting in pistons which are unsound and/or distorted.

It is known to fabricate a piston having an oil gallery from two or more pieces. However, such piston constructions extensively have utilised expensive electron beam welding techniques and are prone to distortion in operation.

It is an object of the present invention to provide a piston which has a large capacity oil cooling gallery and is not so prone to distortion, especially in the piston ring groove area, as are known prior art pistons.

According to the present invention a piston for an internal combustion engine includes a lower crown portion and an upper crown portion, the upper crown portion includes a combustion bowl and a piston ring-groove belt of generally annular form depending from the outer periphery of the crown surface, the lower crown portion comprises a generally circular plate member having an upstanding ring on the upper surface thereof, the upper crown portion and the lower crown portion are joined together by retention means between the combustion bowl and the upstanding ring, and between co-operating spigot and socket means formed on the base of the combustion bowl and on the plate member, to prevent withdrawal by axial forces, and there is an oil cooling gallery defined between the upper crown portion and the lower crown portion.

In a preferred embodiment, the combustion bowl and the upstanding ring may be mutually retained by an interference fit.

Also in a preferred embodiment the spigot and socket means may have co-operating screw threads, the piston being assembled by screwing of the upper and lower crown portions together. The operation of screwing the two portions together also may effect an interference fit between the combustion bowl and the upstanding ring on the plate member.

Other methods of retention between the combustion bowl and the upstanding ring, and between the spigot and socket means, may be employed. In particular, the spigot and socket may be welded together after press fitting of the upper and lower crown portions together. Such welding is not extensive, and is remote from the piston ring groove area, so that distortion in this area in the operation of the piston is not likely because of the welding.

Another advantage of the above described construction is that the security of the two crown portions is entrusted to two separate connections which are interdependent. The connected spigot and socket prevents the retention between the lower end of the combustion bowl and the upstanding ring from parting, whilst this retention reduces the stress on the connection between the spigot and socket.

It is preferred that the lower periphery of the depending piston ring-groove belt rests on top of the outer edge of the circular plate member without any external means of attachment. This allows free radial deflection due to there being no radial restraint but also ensures a constant axial deformation due to the lower end of the ring-groove belt bearing against the edge of the plate member substantially throughout it's peripheral length. This combination gives reduced "waviness" of the piston ring-groove belt, allowing enhanced stability and efficiency of the piston rings with the co-operating cylinder wall during operation.

The plate member may have gudgeon pin bosses depending from the lower surface thereof.

This piston construction allows and oil cooling gallery of relatively large proportions to be formed due to the high accuracy with which the upper and lower crown portions may be formed. It is preferred that the piston crown portions be made of ferrous materials and be produced by an investment casting technique, for example. The upper crown portion may be made of a heat resistant steel, for example, whilst the lower crown portion may be made of a steel more suited to the mechanical requirements of the pin bosses. Nickel alloys may, if desired, be used for the upper crown portion.

The present piston construction may also be of reduced weight compared to known pistons due to the close control of wall thickness in the production methods available.

The piston of the present invention may have integral skirt features in a monolithic construction or may have a separate articulated skirt component.

In order that the present invention may be more fully understood an example will now be described by way of illustration only with reference to the accompanying drawings, of which:

FIG. 1 shows a section in elevation through part of a piston according to the present invention, having a crown formed of two portions, FIG. 2 which shows a view of the piston in FIG. 1, looking in the direction of the arrow "A", and FIG. 3 corresponds to a portion of FIG. 1, and shows part of an alternative arrangement for joining the two portions of the piston crown.

Referring now to the drawings and where the piston is denoted generally at 10 and comprises an upper crown portion 12 and a lower crown portion 14. The upper crown portion 12 has a combustion bowl 18, a piston ring-groove belt 20 having piston ring grooves 22 therein, and being of annular form depending from the outer periphery 24 of the crown surface 26. At the lower outer surface of the combustion bowl 18 there is a machined portion 28 which co-operates with the lower crown portion as described below. The combustion bowl has a spigot 30 on the underside thereof, the spigot having a screw threaded portion 32. The upper crown portion 12 is, in this instance, an investment casting of a heat resistant steel containing 9 wt % chromium and 1 wt % molybdenum. The lower crown portion 14 comprises a substantially circular plate member 36, having on the underside thereof a cruciform stiffening rib 38 and gudgeon pin bosses 40 depending from struts 42 and having strengthening webs 44. In the centre of the plate member 36 is a socket 46 having a screw thread 48 which co-operates with the screw threaded spigot portion 32 of the upper crown member 12. On the upper surface 50 of the lower crown member 14 there is an upstanding ring 52 having a machined inner diameter 54 which is an interference fit with the machined portion 28 of the combustion bowl 18. There is an oil cooling gallery 58, defined between the inner wall 60 of the ring- groove belt 20, the inner wall 62 of the crown surface 26, the outer wall 64 of the combustion bowl 18 and the upper surface 50 of the plate member 36. Apertures 66 are formed in the plate member for oil entry and exit from the cooling gallery 58. Optional additional such apertures 68 may be provided in the plate member 36 for cooling the underside of the combustion bowl 18, if desired. In this case the lower crown portion 14 is also a steel investment casting but containing 1 wt % chromium and 0.2 wt % molybdenum.

The piston is assembled by screwing of the upper and lower crown portions together via the spigot 30 and socket 46, the operation of screwing together also causing the co-operating machined surfaces 28 and 54 to be brought together to form an interference fit. The lower periphery 70 of the ring groove belt 20 rests on the outer periphery 72 of the plate member 36.

It will be appreciated that the stated materials from which the upper and lower crown portions are made are merely exemplary and that very many different materials may be employed for these components.

Instead of the screw threaded spigot and socket being provided, the piston may be joined together by press fitting to engage the surfaces 28 and 54 followed by joining the co-operating spigot 30' and socket 46' by employing electron beam welding techniques, the weld being indicated at 74 in FIG. 3.

The retention means between the combustion bowl and the upstanding ring; and the retention between the spigot and socket; each may have any convenient form to prevent withdrawal by axial forces.

The piston has not been described with any of the skirt features necessary for lateral support in operation but, the lower crown portion may be provided with skirt portions such as are described in EP-A-0 071 361 of common inventorship herewith or may be of articulated construction having a separate skirt member such as described in EP-A-0238146.

I claim:

1. A piston for an internal combustion engine includes a lower crown portion and an upper crown portion, the upper crown portion including a combustion bowl and a piston ring-groove belt of generally annular form depending from the outer periphery of the crown surface, the lower crown portion comprises a generally circular plate member having an upstanding ring on the upper surface thereof, the upper crown portion and the lower crown portion are joined together by retention means between the combustion bowl and the upstanding ring, and between co-operating spigot and socket means formed on the base of the combustion bowl and on the plate member, to prevent withdrawal by axial forces, and there is an oil cooling gallery defined between the upper crown portion and the lower crown portion.

2. A piston according to claim 1 in which the combustion bowl and the upstanding ring are retained by an interference fit there between.

3. A piston according to claim 1 in which the spigot and socket means have co-operating screw threads.

4. A piston according to claim 1 in which the spigot and socket means are welded together.

5. A piston according to claim 1 in which the lower periphery of the depending piston ring-groove belt rests on the periphery of the plate member.

6. A piston according to claim 1 in which the oil cooling gallery is defined between the inner wall of the piston ring-groove belt, the inner wall of the crown surface, the outer wall of the combustion chamber bowl and the upper surface of the plate member.

7. A piston according to claim 1 in which the plate member defines oil entry and exit apertures, allowing oil access to and egress from the cooling gallery.

8. A piston according to claim 1 in which the plate member defines oil entry and exit apertures below the bottom of the combustion chamber bowl.

9. A piston according to claim 1 in which gudgeon pin bosses are provided depending from the lower surface of the plate member.

10. A piston according to claim 1 in which the upper and lower crown portions are made from ferrous materials.

* * * * *